Oct. 17, 1961 W. C. MOORE 3,005,090
RECHARGEABLE BATTERY HANDLE
Filed Dec. 12, 1958
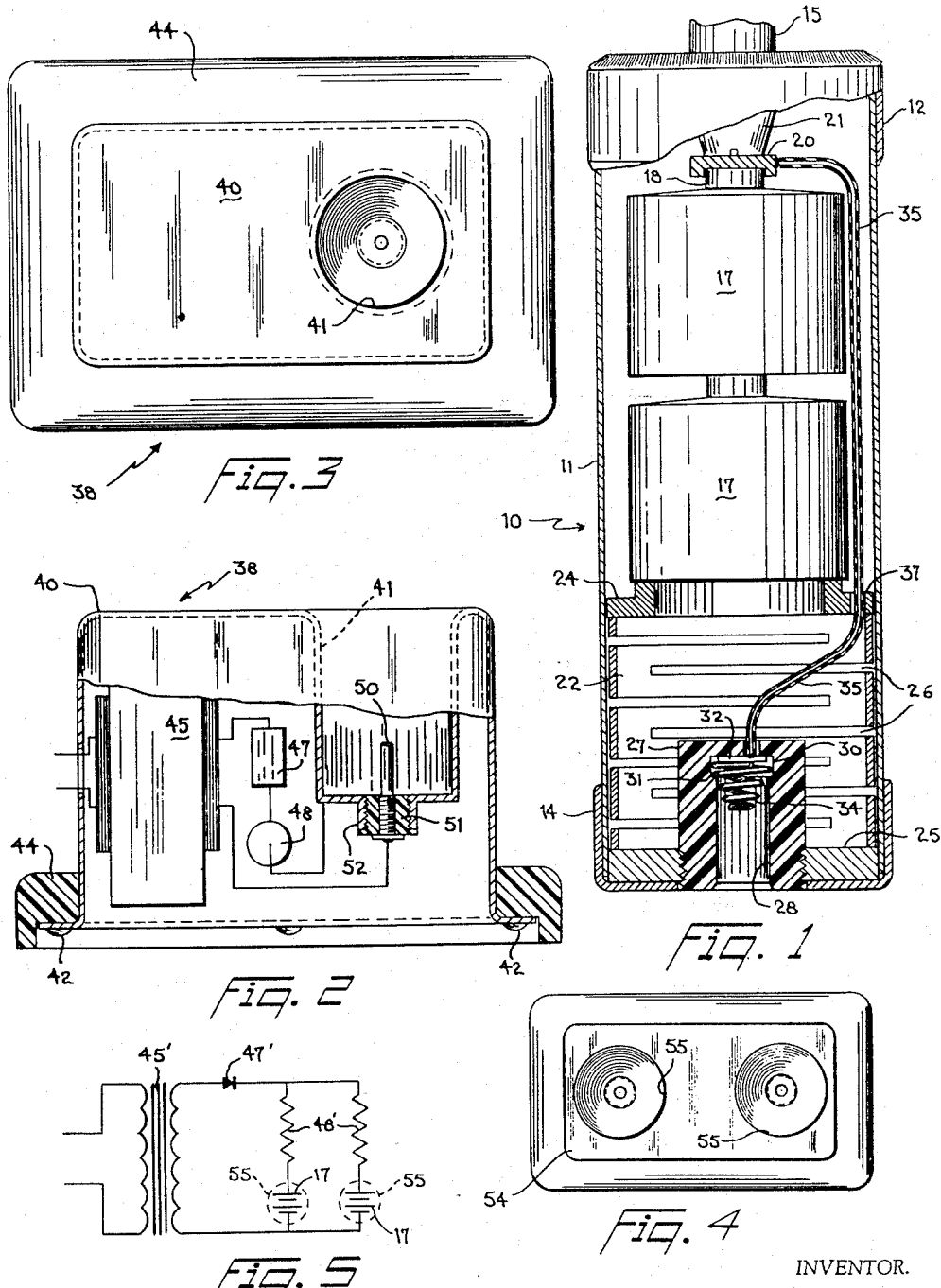
INVENTOR.
WILLIAM C. MOORE
BY Richard von K. Bruns
Attorney United States Patent Office 3,005,090
Patented Oct. 17, 1961

3,005,090
RECHARGEABLE BATTERY HANDLE
William C. Moore, 62 E. Elizabeth St., Skaneateles, N.Y.
Filed Dec. 12, 1958, Ser. No. 779,931
5 Claims. (Cl. 240—10.6)

This invention relates generally to battery handles for electrically illuminated diagnostic instruments, and has particular reference to a rechargeable battery handle and recharger unit for use therewith, the handle being arranged to utilize rechargeable batteries as a current source and being constructed so that these batteries can be recharged by simply placing the handle in the recharger unit whenever it is not in use.

At the present time, practically all battery handles utilize ordinary flashlight type dry cells as a source of electrical energy. These batteries, although satisfactory when new, have a tendency to deteriorate and leak as they grow older, and when this happens they frequently corrode the handle to the extent that it becomes useless and must be replaced. Another disadvantage of the conventional type of flashlight dry cell is the short duration of its peak operatnig efficiency, which necessitates frequent replacement.

In order to eliminate these disadvantages, the present invention contemplates the provision of a novel battery handle, which is usable with existing types of electrically illuminated diagnostic instruments, and is adapted to contain hermetically sealed rechargeable type batteries that have an exceedingly long life as the source of electrical energy. A charging circuit built into the battery handle enables the batteries to be maintained at full charge without removing them from the handle by means of the complemental recharger unit.

The primary object of the present invention, therefore, is to provide a battery handle construction which is adapted to utilize rechargeable batteries and includes a built in charging circuit for same.

Another important object of the invention is to provide a battery handle construction which under normal conditions need never be replaced because of battery corrosion.

Another important object of the invention is to provide a battery handle construction having a source of electrical energy which ensures a continuing light source of maximum brightness.

A further important object of the invention is to provide in combination with a battery handle having rechargeable batteries a convenient recharger unit in which the battery handle may be stored and recharged when not in use.

Still another important object of the invention is to provide a rechargeable battery handle and recharger unit which are simple in construction and yet are durable and efficient in operation.

Other objects and advantages of the invention will become apparent from the following detailed description thereof read in conjunction with the accompanying drawings which illustrate a representative embodiment of the invention for the purpose of disclosure.

In the drawings:

FIGURE 1 is an enlarged vertical section through a battery handle embodying the invention;

FIGURE 2 is a side elevation, partly in section, of a battery charging and storage unit for the battery handle;

FIGURE 3 is a top plan view of the unit shown in FIGURE 2;

FIGURE 4 is a top plan view of an alternative form of charging unit; and

FIGURE 5 is a wiring diagram for the charging unit shown in FIGURE 4.

Having reference now to the drawings, wherein like reference numbers designate the same part in each of the views, 10 generally indicates the battery handle which comprises a tubular body member or casing 11, a top closure or cap 12 fixed on the upper end of the casing, and a removable bottom closure 14 mounted on the lower end of the casing. In the embodiment shown, casing 11 is formed of metal or other suitable current conducting material and is of such a size that it can be easily held in the hand. The top closure 12 is also formed of a suitable current conducting material and is provided with an upstanding tubular nipple 15 by means of which a diagnostic instrument can be attached to the handle. For a detailed description of the attachment means and electrical connections therein, reference may be had to the applicant's copending application Ser. No. 767,450, filed Oct. 15, 1958, for Battery Handle Construction, now abandoned.

The casing 11 contains the source of electrical energy for illuminating the instrument mounted thereon, and in accordance with the invention this source comprises one or more rechargeable batteries 17 which may be of the commercially available nickel cadmium sintered-plate type. As shown in FIGURE 1, two such batteries are stacked in the casing with the upper terminal 18 of the top battery being electrically connected through a contact plate 20 to one terminal 21 of a rheostat (not shown) mounted in the top closure 12. The batteries are urged into engagement with one another and with the rheostat terminal by means of an axially compressible spring sleeve 22 positioned between a flanged ring 24 and a disc shaped insert 25 in the bottom closure 14.

Axial compressibility of the spring sleeve 22 is obtained by cutting a plurality of alternately arranged transverse slots 26 therein, the slots being spaced uniformly along the sleeve in the axial direction thereof and extending more than 180° around its circumference. Each of the slots thus cuts the sleeve more than half way through, and the circumferential length of these slots determines the degree of compressibility or flexibility of the sleeve. A similar spring is disclosed in said copending application Ser. No. 767,450, as are the details of the rheostat that is mounted in the top closure. With this arrangement, current from the batteries 17 is delivered to the instrument through the rheostat and an insulated lead within the nipple 15, and the circuit is completed through the nipple, top closure, casing and ring 24.

In order to enable the batteries 17 to be recharged without removing them from the battery handle, the latter includes a charging circuit which is arranged to operate in conjunction with a special recharger unit to be described. To this end, a post 27 of insulating material is mounted in a central opening through the bottom closure and disc 25 as by a threaded connection, and this post extends up into the interior of the casing as shown. A bore 28 in the bottom of the post terminates at its upper end in an increased diameter portion 30 so that an interior annular shoulder 31 is formed therein. A contact plate 32 is held against the upper wall of the bore by means of a helical spring 34 which is retained in position by engagement of its larger diametered windings with the shoulder 31. Contact plate 32 is connected to an insulated lead 35 that extends through a small opening at the upper end of the insulating post and through an opening or notch 37 in the ring 24 to the upper end of the casing where it is connected to the contact plate 20, the latter being in the form of an inverted cup which overlies the top terminal of the upper battery as shown. With this ararngement, current supplied to the battery handle through the spring 34 and contact plate 32 operates to recharge the batteries 17.

The recharger unit is indicated generally at 38 in FIG-

URES 2 and 3 and comprises a housing 40 having a cylindrical top opening well 41 of a diameter that allows the battery handle to be received therein with a sliding fit. The housing is formed of metal or other suitable current conducting material and is secured as by screws 42 to a base member 44 of insulating material, the bottom of the housing normally being closed by a removable plate, not shown. Mounted in the housing is a charging circuit which comprises a transformer 45, a rectifier 47 and a resistor 48, the primary of the transformer being adapted to be connected to a suitable wall outlet by means of a conventional line cord and plug.

The rectifier and resistor are connected in series between one lead of the transformer secondary and the metal wall of the well 41, and the other lead of the secondary is connected directly to a contact pin 50 which projects up into the well, the pin being carired by an insulating bushing 51 which is threaded into a neck 52 formed at the bottom of the well. When the battery handle is placed in the well, the pin 50 engages the spring 34 and establishes a charging circuit through the batteries, the return side of the circuit being through ring 24, the battery handle casing and the metal wall of the well which is in contact with the bottom closure 14 of the handle. However, when the handle is removed from the recharger unit, the charging circuit therein is open and the current from the batteries is only effective to illuminate the instrument mounted on the handle.

The recharger unit 38 can be made in any size or shape and can be wall mounted or supported by a desk or table as in the model shown. The unit provides a convenient storage place for the battery handle, and at the same time keeps the batteries at full charge so that the handle is always ready for use and ensures ample current for maximum illumination by the instrument. By proper selection of the values of the electrical components, the unit can be made to deliver a trickle current which can be applied to the batteries indefinitely without damage. When the battery handle is needed, the physician simply withdraws it from the unit and attaches the instrument he wishes to use. Thereafter, the instrument is removed and sterilized and the handle is simply returned to the unit for storage and battery recharging.

Since it may be desirable to store and recharge more than one battery handle at a time, FIGURE 4 illustrates a recharger unit 54 having a pair of handle receiving wells 55, and FIGURE 5 illustrates the wiring diagram for such a unit. In the wiring diagram, the batteries 17 are shown in circuit with the wells 55 being indicated by the dotted line circle therearound. This circuit is substantially the same as the electrical arrangement indicated in FIGURE 2 and includes a transformer 45', rectifier 47', and a pair of resistors 48' connected in parallel in the circuit. Obviously, the unit can be easily modified to accommodate a larger number of battery handles if desired, as for example when the unit is to be used in a clinic or the like.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. A battery handle for electrically illuminated diagnostic instruments comprising a hollow casing, a plurality of rechargeable sealed, dry type battery cells mounted in stacked relation in said casing, a top closure for said casing having means for attaching an instrument thereto, a bottom closure for said casing, means in said casing for conducting current from said battery cells to the instrument through said top closure, and means in said casing for delivering current from an external source to said battery cells to recharge same, said last-named means including an insulated recessed contact in said bottom closure and an insulated conductor in said casing connecting said contact with one terminal of said battery cell stack, the other terminal of said battery cell stack being electrically connected to said casing.

2. Structure as defined in claim 1 wherein said conductor connects said one battery cell terminal through a contact member adapted to overlie said terminal.

3. Structure as defined in claim 1 together with a recharger unit for said battery handle having a recessed well adapted to receive said handle with a close sliding fit, said unit including a charging circuit having a pair of terminals engageable with said insulated battery handle contact and battery handle casing respectively when the handle is positioned in the well.

4. A battery handle for electrically illuminated diagnostic instruments comprising in combination a hollow current conducting casing, a plurality of rechargeable, sealed, dry type battery cells mounted in stacked relation in said casing, a top closure for said casing having means for attaching a diagnostic instrument thereto, a removable current conducting bottom closure for said casing, means in said casing for conducting current from said battery cells to the instrument through said top closure, and means in said casing for delivering current from an independent recharger unit to said battery cells to recharge same, said last-named means including a single insulated and recessed contact in said current conducting bottom closure and an insulated conductor located in the interior of said casing connecting said insulated contact with one terminal of said battery cell stack, the other terminal of said battery cell stack being electrically connected to said current conducting casing.

5. Structure as defined in claim 4 together with a portable recharger unit for said battery handle having a well, defined by current conducting material, for receiving said battery handle with a close sliding fit, said recharger unit including a first terminal comprising an insulated contact pin projecting upwardly from the bottom of said well for engagement with said insulated battery handle contact and a second terminal comprising the current conducting material of said well which engages said current conducting battery casing when the handle is positioned in the well, said recharger unit including a transformer having secondary winding leads connected to said first and second terminals, one of said leads being connected to one of said terminals through series connected rectifying and resistance means.

References Cited in the file of this patent

UNITED STATES PATENTS

| | | |
|---|---|---|
| 1,066,386 | De Zeng | July 1, 1913 |
| 1,165,232 | De Zeng | Dec. 21, 1915 |
| 2,130,388 | Gluck | Sept. 20, 1938 |
| 2,628,339 | Werner | Feb. 10, 1953 |
| 2,818,498 | Foch | Dec. 31, 1957 |

FOREIGN PATENTS

| | | |
|---|---|---|
| 732,364 | Germany | Mar. 1, 1943 |